United States Patent [19]

Bander

[11] Patent Number: 5,276,768
[45] Date of Patent: Jan. 4, 1994

[54] AUTOMATED TELEPHONE INFORMATION SYSTEM

[75] Inventor: James L. Bander, Virginia Beach, Va.

[73] Assignee: Tidewater Consultants, Inc., Virginia Beach, Va.

[21] Appl. No.: 672,666

[22] Filed: Mar. 20, 1991

[51] Int. Cl.[5] .............................................. G06F 15/20
[52] U.S. Cl. ...................................... 395/10; 395/147
[58] Field of Search .................. 364/513, 400; 395/10, 395/11, 147; 370/84

[56] References Cited

U.S. PATENT DOCUMENTS 4,375,097 2/1983 Ulug ...................................... 370/84
5,170,362 12/1992 Greenberg et al. ................. 364/400
5,185,857 2/1993 Rozmanith et al. ................ 395/147

OTHER PUBLICATIONS

Winston, *Artificial Intelligence*, Addison-Wesley: Reading, Mass. 1984, pp. 87–132.
Ross et al., *Discrete Mathematics*, Prentice-Hall: Englewood Cliffs, NJ, 1988, pp. 322–406.
*Heuristics: Intelligent Search Strategies for Computer Problem Solving*, Judea Pearl, Addison-Wesley Publishing Company, Reading, Mass., Oct., 1984, pp. 9–21, 33–65, 74–90 and 146–150.
*The Effectiveness of Telephone Information Service in Transit*, by M. R. Cutler and R. F. Potter, U.S. Department of Transportation, Urban Mass Transportation Administration, Feb. 1984, pp. 1-1-4-30 and 6-1-2-6-47.
*Principles of Artificial Intelligence*, by Nils J. Nilsson, Morgan Kaufman Publishers, Inc., Palo Alto, Calif., 1980, pp. 61–96.

Primary Examiner—Allen R. MacDonald
Assistant Examiner—George Davis

[57] ABSTRACT

A system for responding to telephone queries for transit system information is disclosed in which the information received by transit information operators is used to initiate a pathfinding query, which results in a search using a heuristic method with Island Sets being performed in order to determine, for example, an itinerary which the operator can relate to the caller which answers the caller's query. A stopping rule, based on clock time, iteration count, openings of goal nodes, adjustments of goal node labels and the state of the transaction queue is also disclosed.

2 Claims, 13 Drawing Sheets

AUTOMATED TELEPHONE INFORMATION SYSTEM

BACKGROUND OF THE INVENTION

The invention relates generally to a computerized system for decision making. More particularly, the present invention relates to the real time system for determining itineraries for public transportation systems which are optimal based upon the rider's criteria.

The problem faced by many riders of public transportation systems is that of choosing or determining a route between an origin and a destination. The public transit rider wishes to choose the optimum itinerary for each trip. Often times, many potential riders would like to use public transportation systems, however, they have difficulty determining the exact location of the transit stations, as well as the route to take to get to their destination.

Once a rider has selected public transportation as the optimum transportation mode, the passenger wishes to maximize his utilization of that system by choosing the optimal set of bus and rail routes through the transit system from his origin to the destination at a particular time of day. While different riders have different objectives and, therefore, different utility functions, virtually all passengers place a high value on travel time.

As is well known, a transit system is a public transportation provider which operates vehicles on fixed routes, according to fixed schedules. An urban transit system typically includes buses and rail vehicles moving along fixed routes and stopping at a predetermined set of transit stations or bus stops. Generally, service is provided in both directions along the route. For convenience, the transit authority designates one of the directions inbound and the other outbound. The transit authority publishes a schedule that lists some or all of the stops along the route, with the times that a vehicle on the route arrives at the stop. Such points listed on the schedule are termed time points. The times for stops not listed on the schedule are determined by interpolation. Typically, a schedule lists several running times for each route.

In addition, certain stops in the transit network are transfer points. Two or more routes service those stops and the transit authority allows transfers between at least two of the routes. In many transit networks, the transit authority will not allow transfers that could be used to make a round trip. Therefore, passengers must request a transfer pass on the first route, so that the transit authority can control which route combinations represent valid transfers. The transfer authority may also require transfer passengers to take the very next bus that passes the transfer stop, in order to prevent passengers from visiting two destinations for a single fare. However, a reasonable amount of time must be allowed between alighting from one transit vehicle and embarkment on the next transit vehicle, so that the transfer is possible even when the vehicles run ahead of or behind schedule.

As described above, the transit system normally follows a predetermined schedule. However, that schedule may be changed relatively frequently, for a number of different reasons. For example, holidays and special events may interrupt the service schedule, or cause it to be temporarily rerouted. Construction of the roads travelled by the transit system and of the transit facilities themselves may also cause interruptions. Also, transit vehicle drivers and other transit workers are typically represented by labor unions that demand service changes three to four times per year.

The problem faced by riders who must choose a route between an origin and a destination is known as the transit itinerary selection problem. Since travellers typically also seek to minimize the amount of walking required at their origins or destinations, the number of transfers required during the trip and the travel itself, passengers typically try to maximize utility by choosing the itinerary having a minimum net travel impedance. When a transit system is modeled as a network, with edge costs measured in units of impedance, the transit itinerary selection problem becomes a shortest path problem. If the impedance of the edges varies with the time of day, it becomes a time-dependent shortest path problem.

In solving the shortest path problem, a network contains a single source node and one or more goal nodes. The problem to be solved is to find a path of minimum length from the source node to a goal node. In addition to solving the shortest path problem in a transportation system, it is desirable to determine the time-dependent shortest path.

Each edge cost is associated with an edge cost function which, for a transit itinerary problem, as with airline scheduling problems and other shortest-path problems where a timetable is involved, is assumed to be a discrete function. Thus, arrival time is determined by looking up the destination nodes entry in a timetable.

For many years, riders or potential riders seeking information with regard to routes typically communicated by telephone with an information agent at the local public transportation company. Such transportation agents, who typically are highly trained and may be long time employees of the public transportation system, are very knowledgeable with regard to the routes and timetables of their transportation company. However, sometimes the agents need to refer to books of route maps and timetables in order to answer incoming queries.

Transit information, however, is relatively complicated. Agents must remember schedules, routes, times, inbound or outbound direction, stop locations, addresses, intersections, landmarks, time of day and whether it is rush hour or not, fares and transfer points. Such data, among other pieces of information, must be remembered by the information agent and related to the caller. While individuals who have been information agents for a long period of time generally have such information at their fingertips, it is much more difficult for less experienced agents. In addition, the process for training new information agents is time consuming and lengthy.

The training of agents is only one of the problems that needs to be solved in order to provide timely and accurate information to a caller in a minimum amount of time. Since most callers to a transit information center ask for detailed trip itineraries, an information agent can spend as much as 8 or even 17 minutes a call with each caller. In addition, some callers are potential new riders who are unsure of their route and may call back again with the same questions. If a different agent gives a different answer, even though correct, not only does the transit system lose the amount of time the agent has spent with the caller, twice, but, may also lose the potential rider who doesn't trust the accuracy of the transit information.

Therefore, there is a need in the art for a computerized information system which can be easily learned by information agents in a short period of time and which provides consistent answers for the information agents to provide to the callers. Since each caller is a potential rider, each caller represents potential additional revenue for the transit system. Therefore, it is desirable to be able to answer all incoming calls in a timely manner and to provide correct and repeatable information to the callers in a very short real-time basis.

Therefore, using the instant inventive system, the productivity of the information agents is increased since the length of each call decreases, the number of calls processed per day increases, and the call capture rate increases. The quality of the information provided is accurate and consistent, is up to the minute, and serves to encourage new riders for the transit system. Also, the instant automated telephone information system is easy to learn and reduces training time to hours. Therefore, part-time or temporary personnel can be used in order to supplement the normal staff of information agents, on an as needed basis.

Using the instant invention, time-consuming cross-referencing of routes and schedules is eliminated and the information agent is therefore able to spend more time interacting with the caller. Because calls are shorter, more of them can be handled by the same number of agents with the same number of telephone lines.

For a further discussion of the need for telephone information transit systems, the reader is referred to Cutler, M. R. and Potter, R. F., *The Effectiveness of Telephone Information Services Transit*, U.S. Department of Transportation, Urban Mass Transportation Administration, February, 1984.

SUMMARY AND OBJECTS OF THE INVENTION

In view of the foregoing, it should be apparent that there still exists a need in the art for a system for solving the transit itinerary problem such that the automated telephone information system of the present invention allows telephone information agents to provide fast, consistent and accurate answers to rider's questions about public transportation travel routes, rates and times in a simple and precise manner at a substantially reduced cost to the transit system. It is therefore, a primary object of this invention to provide a system for determining an optimum itinerary for a rider of a public transportation system which is characterized by ease of use and rapid response time.

More particularly, it is an object of this invention to provide an automated telephone information answering system which has particular use as a computerized information system for public transportation systems.

Still more particularly, it is an object of this invention to provide a system for decision making which uses heuristic approaches to solving time dependent shortest path problems.

Briefly described, these and other objects of the invention are accomplished by providing a system in which one of a plurality of queries may be entered into a computer by an information agent which then determines the optimum response to the query. For example, in the event of an itinerary query, the system, after receiving the appropriate origin, destination, and other trip type information, determines the optimum route for travelling from the origin to the destination, taking into consideration the day of the week, the type of transit vehicles utilized, any transfers that are required and the time at which it is desired to arrive and/or depart.

The present invention provides for fast, consistent data retrieval in a transit information system based upon a novel searching system.

The information received by a transit information operator is used to initiate a path finding query. The query program parses the entry of the caller's origin and destination, thus resolving the latitude and longitude of the entry. In the event that no entries in the geographic data base match the entered value exactly, a soundex feature is used to display a menu of geographic locations that sound familiar to the location entered. If the location entered is ambiguous, a menu of matching features is displayed in order to help the operator resolve the ambiguity.

Once a query is initiated, a graph search using a heuristic method with Island Sets is initiated. A complicated stopping rule is also used. The stopping rule is based on clock time, iteration counts, openings of goal nodes, adjustments of goal node labels and the state of the transaction queue. The itinerary or itineraries generated are displayed on the computer screen for the operator, complete with walking directions at the origin and destination, transit times, route numbers and descriptions and fare table entries. The complete itinerary generation process takes an average of approximate 2.5 seconds.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figure 1:
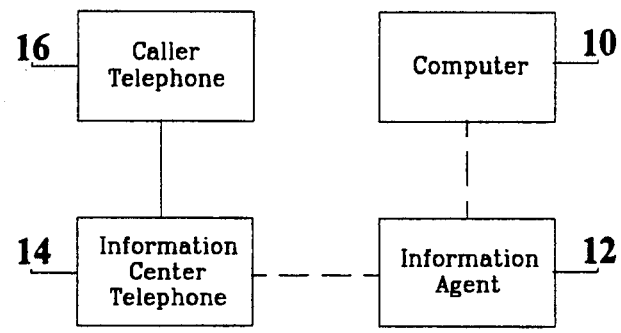
FIG. 1 is a block diagram showing the apparatus of the present invention.

Referring now in detail to the drawings wherein like parts are designated by like reference numerals throughout, there is illustrated in FIG. 1 a block diagram of the apparatus for use with the present invention. An information agent 12 is located at a central point and is provided with a computer system 10 which stores the system of the present invention. The computer system 10 may be a network of IBM compatible 386-based personal computers, such as an AT&T 6386 microcomputer. Alternatively, the system can operate on a single 386-based IBM compatible microcomputer. The system of the present invention could also be run on any micro or minicomputer that will run AT&T's UNIX Version 3.2 or later.

In order to run the system of the present invention efficiently, the microcomputer 10 needs enough RAM memory to hold the data structures. The typical amount of RAM memory necessary is from about 8 megabytes to 12 megabytes, depending upon the complexity of the transit network, the number of bus stops, the number of scheduled runs each bus makes during the day, whether a rail system is involved, etc. Enough disk storage is needed for use in conjunction with the computer 10 to allow editing of the transit data. It is preferred that about 300 megabytes of disk storage be available to the computer 10.

The information agent is also supplied with a telephone 14 with which to receive calls from a caller utilizing a caller telephone 16, as previously discussed.

Upon receiving a telephone call by means of the information center telephone 14, the information agent 12 determines the type of query the caller is making. Generally, there are four types of queries. The first type of query is one in which the caller wants to know how to travel from one place to another, including the names of stops, bus and rail route designators and signages, transfers, times and fares. The second type of query is called a boarding time query and is one in which the caller wants to know the signages, route designators and boarding times of all buses and rail cars that stop at bus or rail stops within walking distance of a certain location.

The third type of query is a stop location query and is one in which the caller wants to know all of the bus and rail stops within walking distance and the signages and route designators of the routes that use those stops. The fourth type of query is a route/line query in which the caller wants to know the route designators of the bus and rail routes serving nearby stops.

After the information agent 12 has properly logged into the computer 10, the operator may enter into the computer, as appropriately prompted, the LOCATION FROM where the caller wants to leave, which may be a street address, an intersection or a landmark. The SECTOR field may next be inputted by the operator or, if the operator leaves that field blank, the system will fill it in. The SECTOR field is a two or three letter code which identifies the sector, either city, county or section of a city, such as, northwest, northeast, southwest, southeast, in which the departure or arrival place is found. A FORCED ROUTE field is provided in the event that the caller prefers to begin a trip using a certain bus or rail route. If that is the case, the operator must enter that route, otherwise it may be left blank.

In the event that a caller has requested a trip type of query, the operator next enters in the TO field, the location where the caller wants to go. In the event that the caller changes from a trip or route/line type of query to a boarding time or stop location type of query, then the TO query changes to a route and the operator enters a route designator. The next field to be entered is the type of query, in the instant example, types 1-4, corresponding to the trip, boarding time, stop location and route/line queries.

The next data field filled in by the transit agent is the DAY field. Examples of an input for this field are today, weekday schedule, a Saturday schedule, a Sunday schedule or a special schedule. After entering the data in the DAY field, the next field captured by the operator is the CURRENT/FUTURE or C/F field. The default for this field is set for current.

The next field encountered by the information agent 12 is the MINIMIZE or MIN. field. Data entered in this field is utilized by the system of the present invention to rank responses when there is more than one possible response to a type one or trip query. There are four possible data entries for this field. The default for the MIN. field is T for time, since callers usually want to minimize their travel time. However, other priorities can be inputted for getting to a destination, such as an X which indicates that the number of transfers is to be minimized, a W which indicates that the total walking distance is to be minimized and a D to indicate that the total amount of travel time, including time spent waiting for a bus or train plus actual travel time, is to be minimized.

The next field encountered by the information agent is the ANY/BUS/RAIL field which enables the agent to give a response that includes both rail and bus travel, if ANY, the default, is selected. If the caller prefers only to travel only by bus, then a B is entered; if only by rail, a R is entered.

The next field is the ARRIVE/DEPART field, for which the default is DEPART, since callers usually state that they need to leave after a certain time. In the event that the caller wants to arrive before a certain time, the ARRIVE option is selected.

The last field to be completed by the information agent or the system is the TIME field. The default for this field is the internal clock of the system of the present invention, which inputs the present time. If the caller gives a different time, it is entered in this field, that is, the time that the caller wants to arrive or depart.

After the information agent 12 has correctly answered all of the necessary information on the query screen, the SEND button is depressed on the keyboard and the instant system responds with a list of itineraries that best match the caller's needs. For a trip query, each answer displays a trip itinerary which can then be read directly to the caller. The first line of each response gives the popular name of the stop from which the caller will depart, the time that the transit vehicle leaves, its route designator and whether it is inbound or outbound. The second line gives the signage of the transit vehicle, the stop at which the caller is to get off and the arrival time at that stop. If the itinerary includes transfers, each is listed as a departure and arrival, repeating the screen positions.

It should be understood that a color monitor may be utilized with the computer 10 in which both the input data fields and the output information may be configured in different colors for ease of use.

The response for a type 1 or trip query also displays the cost for both bus and rail, the total cost, and the distance required to walk from the location of the caller to the transit stop and from the stop the caller gets off to the caller's destination. The direction in which the caller must walk is also indicated.

In the event that the caller has requested a boarding time or type 2 query, the system of the present invention responds with a list of the popular descriptions of the stop or stops within walking distance of the caller's location. For each stop, there is a list of the route designators and the signages of the buses or trains that stop there and, usually, departure times within an hour of the time the caller wishes to leave. In the event that there are four responses, two are provided before the time the caller wants to leave and two are provided after that time.

When a type 3 or stop location query has been received by the information agent and input into the computer 10, a response similar to a boarding time or type 2 query is provided, except that no times are listed. When the caller has requested a type 4 or route/line query, the system responds with a list for each bus or rail stop convenient to the caller and a list of routes that service that stop. No times, route designators or directions are given.

Figure 2:
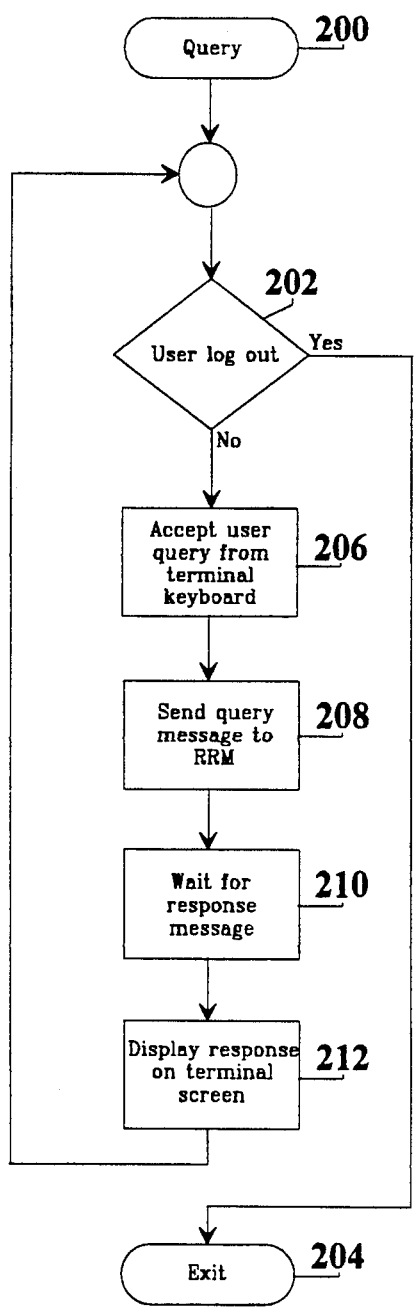
FIG. 2 is a flow chart showing the software of the query module which forms part of the system of the present invention.

FIG. 2 is a flow chart showing the Query Module for use with the present invention. The Query Module functions to accept a query from the information agent 12, to communicate that query to the Rapid Routing Module (RRM) shown in FIGS. 5a-5i, to receive the response back from the Rapid Routing Module and to display it on the terminal screen of the information agent.

In operation, the computer 10, once it has been turned on and the system of the present invention entered, is in the Query Module 200. The system then determines whether the information agent 12 has logged out at step 202. If an affirmative determination is made at step 202, then the system of the present invention exits from the Query Module 200 at step 204. If a negative determination is made at step 202, then the Query Module 200 accepts a query from the terminal keyboard of the information agent 12 at step 206, sends that query to the Rapid Routing Module at step 208 and then waits for a response message from the Rapid Routing Module at step 210. Once the Query Module has received a response from the Rapid Routing Module at step 210, it is displayed on the terminal screen of the information agent's computer 10, at step 212. The system then returns to execute steps 202 and 206-212, as discussed above.

Figure 3:
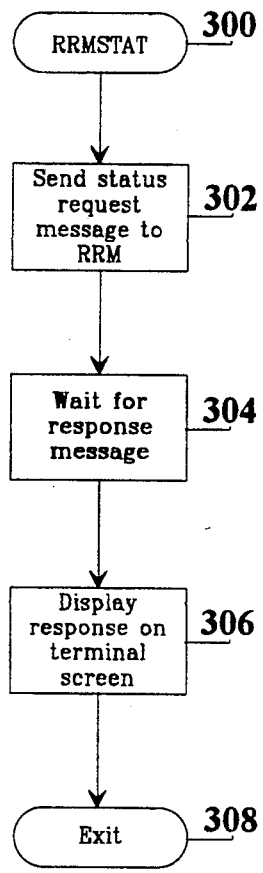
FIG. 3 is a flow chart showing the rapid routing module status module portion of the system of the present invention.

FIG. 3 is a flow chart of the Rapid Routing Module Status Module (RRMSTAT) 300. The purpose of this module is to allow operators to confirm that the Rapid Routing Module is operating efficiently. In operation, the Rapid Routing Module Status Module sends a status request message to the Rapid Routing Module at step 302. The Rapid Routing Module Status Module then waits for a response message from the Rapid Routing Module at step 304. It then displays the received response on the terminal screen of the information agent's computer 10 at step 306. The Rapid Routing Module Status Module stops at step 308.

Figure 4:
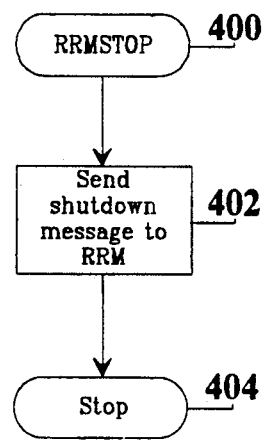
FIG. 4 is a flow chart showing the rapid routing module stop module which forms part of the system of the present invention.

The Rapid Routing Module Stop Module (RRMSTOP) 400 is shown in FIG. 4. The purpose of the Rapid Routing Module Stop Module is to allow operators to shut down the system. Once called, the Rapid Routing Module Stop Module 400 sends a shut-down message to the Rapid Routing Module at step 402 and then the system stops at step 404.

Figure 5A:
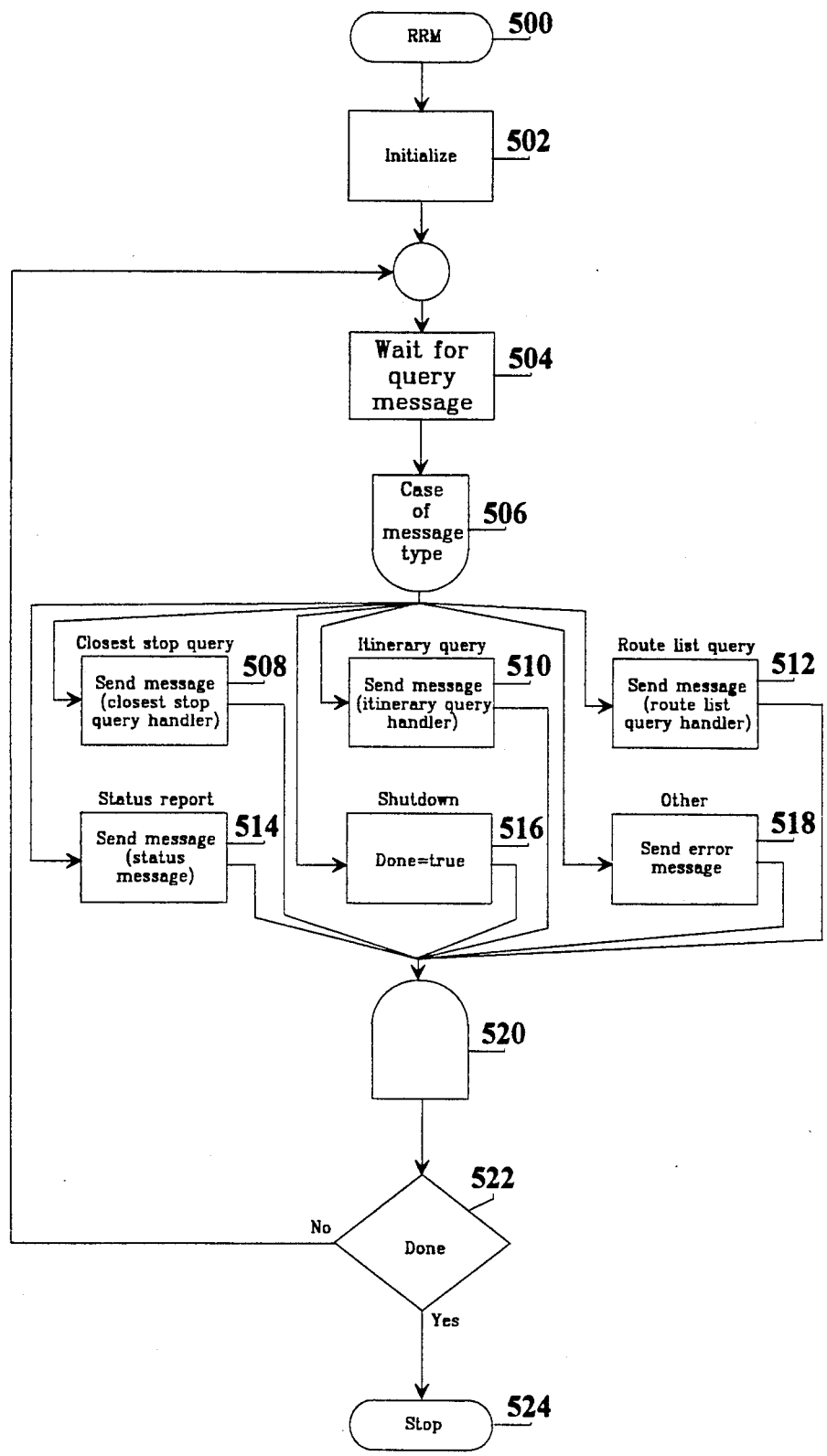
FIGS. 5a, 5b, 5c, 5d, 5e, 5f, 5g, 5h and 5i are flow charts showing the rapid routing module which forms part of the system of the present invention.
Figure 5B:
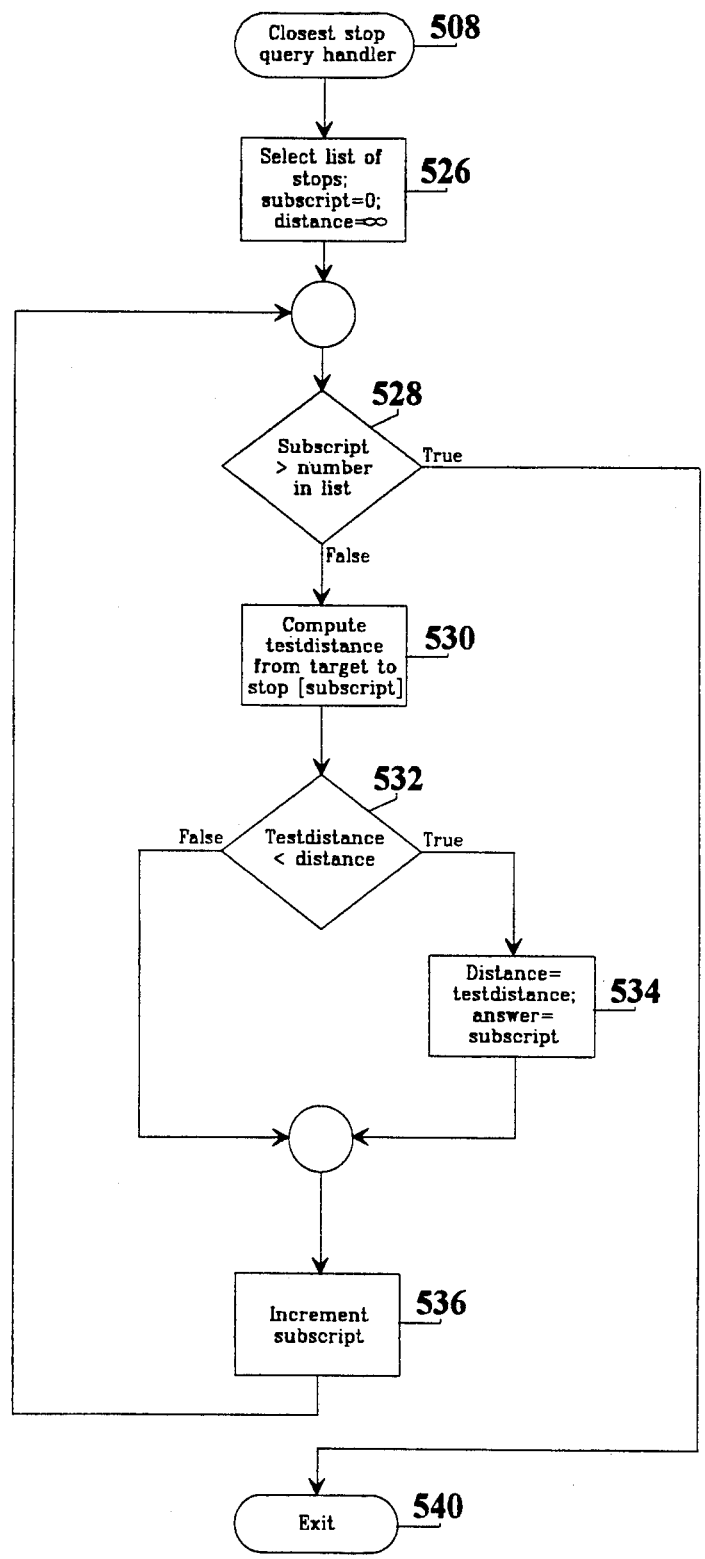

FIGS. 5a-5i contain flow charts of the Rapid Routing Module 500 used with the present invention. The Rapid Routing Module 500 is first initialized at step 502 and then the system waits at step 504 for a query message from an information agent 12 or other person. Upon receiving a query message at step 504, a determination is made at step 506 of the type of query message received. If a closest stop query is received at 506, the Rapid Routing Module 500 jumps to the closest stop query handler subroutine 508, the flow chart of which is shown in FIG. 5b.

Figure 5C:
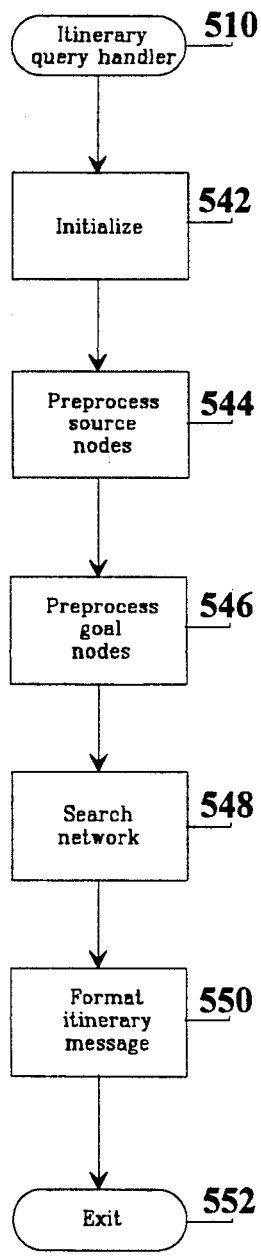

If it is determined at step 506 that an itinerary query has been received, then the system jumps to step 510 and sends a message to the itinerary query handler module 510, the flow chart of which is shown in FIG. 5c.

Figure 5D:
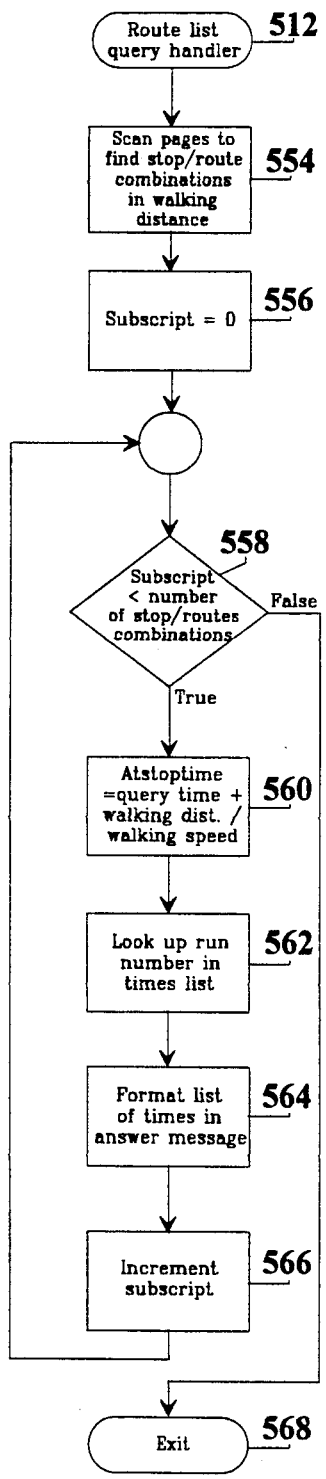

If at step 506, it is determined that a route list query message has been received, then the system jumps to step 512 and sends a message to the route list query handler module 512, the flow chart of which is shown in FIG. 5d.

If the type of message received at step 506 is determined to be a status request, such as that received from the Rapid Routing Module Status Module 300 at step 302, the status message is sent at step 514. If the type of message received at step 506 is determined to be a shutdown message, such as that received from step 402 of the Rapid Routing Module Stop Module, then the system jumps to step 516 and sets the value of Done to be equal to True.

If any other type of message is received at step 506, then the system jumps to step 518 and sends an error message.

After the execution of steps 508-518, the Rapid Routing Module 500 continues at step 520 and then queries at step 522 as to whether its requested task has been completed. If an affirmative determination is made at step 522, then the Rapid Routing Module 500 stops at step 524.

If a negative determination is made at step 522, then the operation of the Rapid Routing Module returns to wait for a query message at step 504.

The closest stop query handler routine 508 is shown in flow chart form in FIG. 5b. It is called from step 508 of the Rapid Routing Module 500 shown in FIG. 5a. After being called, the closest stop query handler 508 selects a list of all of the stops in the transit system, and then sets the value of subscript equal to 0 and the value of distance equal to infinity, all at step 526. A determination is then made at step 528 of whether the value of subscript is greater than the number of stops in the selected list of stops. If an affirmative determination is made at step 528, then it has been determined that all of the stops in the list have been examined and the closest stop query handler subroutine exits at step 540.

If a negative determination is made at step 528, indicating that there are more stops to examine, then the distance from the target or caller's location to the stop whose position in the list is indicated by subscript is computed at step 530. A determination is then made at step 532 of whether this test distance is less than the value of the variable distance, which would indicate that the current stop is closer to the target location than any stop previously examined.

If a negative determination is made at step 532, then the value of subscript is incremented at step 536 and the closet stop query handler subroutine 508 jumps to again make a determination at step 528 of whether the value of subscript is greater than the number of stops in the list. If an affirmative determination is made at step 532 that the test distance is less than the value of distance, then the value of distance is set equal to the test distance and the value of answer is set equal to the subscript of the stop at that distance at step 534. The subroutine then increments the value of subscript at step 536 and returns again to begin processing the next stop in the list at step 528.

In the foregoing manner, the closest stop query handler selects the closest transit stop to the destination of the caller.

In the event that the Rapid Routing Module 500 has determined that a route list query has been made at step 506, the route list query handler routine 512, the flow chart of which is shown in FIG. 5d, is called.

Upon being called, the route list query handler routine 512 first scans the stored data pages to find the stop/route combinations that are in walking distance of the address given by the caller, at step 554. The value of subscript is then set to 0 at step 556 and a determination is made at step 558 of whether the value of subscript is less than the number of stop/route combinations found in step 554. If a negative determination is made at step 558, meaning that no appropriate stop/route combinations have been found, then the route list query handler routine 512 exits at step 568 and the Rapid Routing Module then continues its processing at step 520.

If an affirmative determination is made at step 558, meaning that at least one stop/route combination has been located at step 554, a determination is made at step 556 of whether the route stop time is equal to the query time plus the walking distance divided by the walking speed. That is, a determination is made of when the appropriate stop of a transit vehicle will occur such that the caller can readily walk to the stop to board the transit vehicle with a reasonable margin of time. The run number of the transit vehicle to be boarded is then looked up in the times list at step 562 and a list of times is assembled at step 564 in an answer message. The value of subscript is then incremented at step 556 and the route list query handler routine then begins processing again at step 558.

Figure 5E:
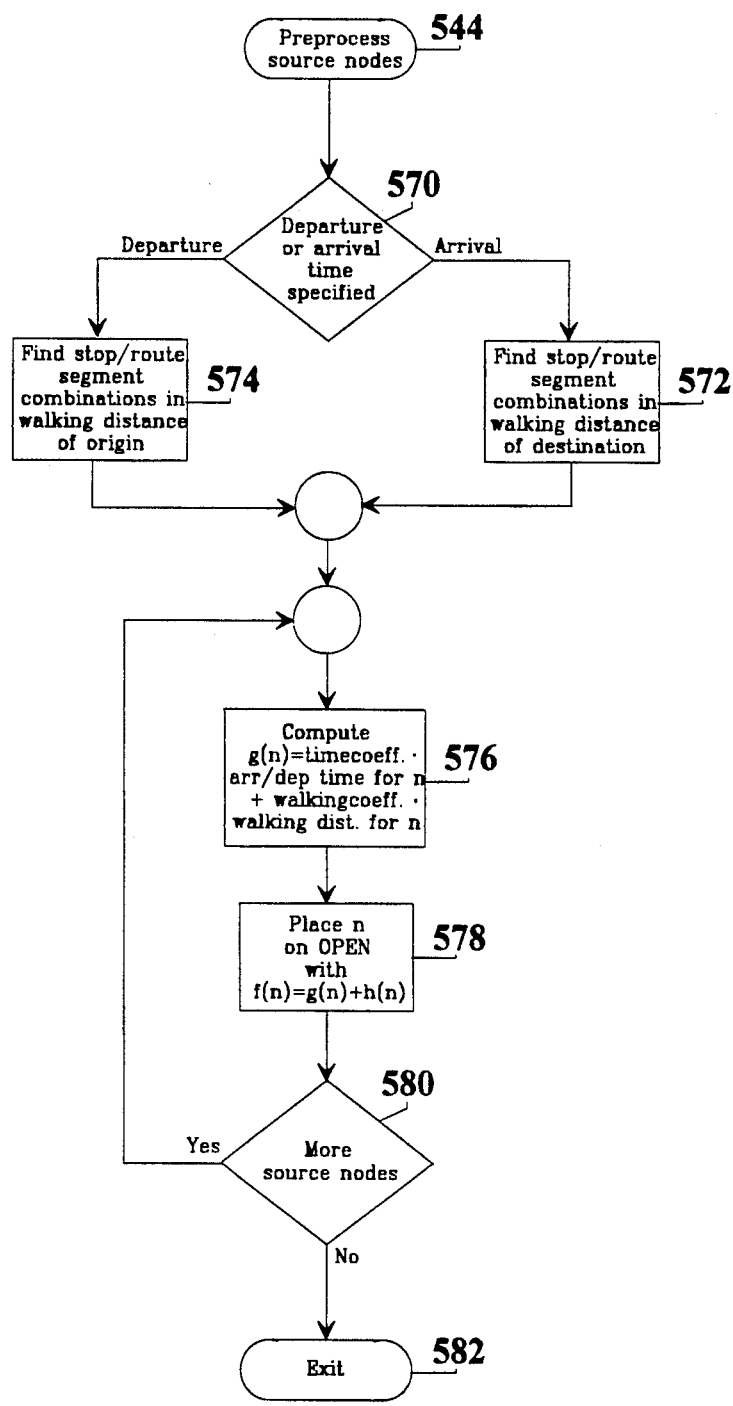

The itinerary query handler subroutine 510 is shown in FIG. 5c and is called from step 510 of the Rapid Routing Module of the inventive system as shown in FIG. 5a. After being called, the itinerary query handler 510 first initializes at step 542 and then jumps to the preprocess source nodes subroutine 544, the flow chart of which is shown in FIG. 5e. After receiving control back from the preprocess source nodes subroutine 544, &he itinerary query handler 510 then jumps to the preprocess goal nodes subroutine 546, the flow chart of which is shown on FIG. 5f. After receiving back the response from preprocess goal nodes subroutine at step 546, the itinerary query handler routine 510 then jumps to the search network subroutine 548, the flow chart of which is shown in FIGS. 5g-5h.

After receiving a response back from the search network at step 548, the itinerary query handler 510 formats the itinerary message at step 550 which is transmitted back to the Rapid Routing Module 500 and then exits at step 552.

The preprocess source nodes subroutine 544, which is called from the itinerary query handler routine 510, is shown in flow chart form in FIG. 5e. After being called, the preprocess source nodes subroutine 544 first makes a determination at step 570 of whether the caller has specified a departure or an arrival time. If the caller has specified an arrival time, then a determination is made at step 570 to execute step 572, which finds the stop/route segment combination within walking distance of the destination specified by the caller.

If a determination is made at step 570 that the caller has specified a departure time, then step 574 is executed instead of step 572 which finds the stop/route segment combinations within walking distance of the origin or current location given by the caller.

After steps 572 or 574 are executed, as appropriate, the preprocess source nodes subroutine 544 then computes a value for g(n) as the arrival/departure time for n multiplied by a coefficient representing the value of travel time, plus the walking distance multiplied by a coefficient representing the walking time at step 576. The value g(n) is the cost of travelling from the origin node to node n along the best path known at the current iteration. The value of g(n) changes as better paths are found from the start node to node n.

At step 578, the preprocess source nodes subroutine 544 places node n on OPEN with the evaluation function $f(n) = g(n) + h(n)$, where h(n) is the heuristic function, an estimate of the cost to go from node n to a goal node. Those of ordinary skill in the art will recognize that evaluation functions such as f(n) are not functions at all, since, as discussed above, the value of g(n), the node labels, changes as better paths are found from the start node to node n.

For a more complete discussion of the real-valued mapping evaluation function f(n), reference is made to an article entitled "A Formal Basis for the Heuristic Determination of Minimum Cost Paths", by Hart, P. E. Nillson, N. J., and Raphel B., *IEEE Trans. Systems, Science and Cybernetics*, SCC-4(2), 100-107, 1968, and a textbook by Judea Pearl entitled *Heuristics: Intelligent Search Strategies for Computer Problem Solving*, Reading, Massachusetts: Addison-Wesley, 1984.

A determination is then made at step 580 of whether more source nodes are on the list computed in step 572 or 574. If an affirmative determination is made at step 580, then the preprocess source nodes subroutine 544 jumps to again repeat steps 576 and 577. If a negative determination is made at step 580, then the preprocess source nodes subroutine 544 exits at step 582.

Figure 5F:
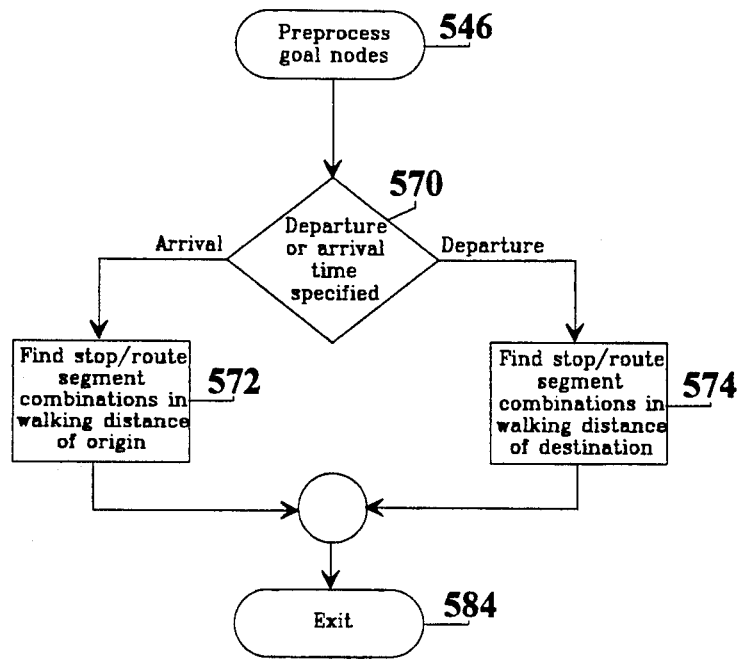
Figure 5G:
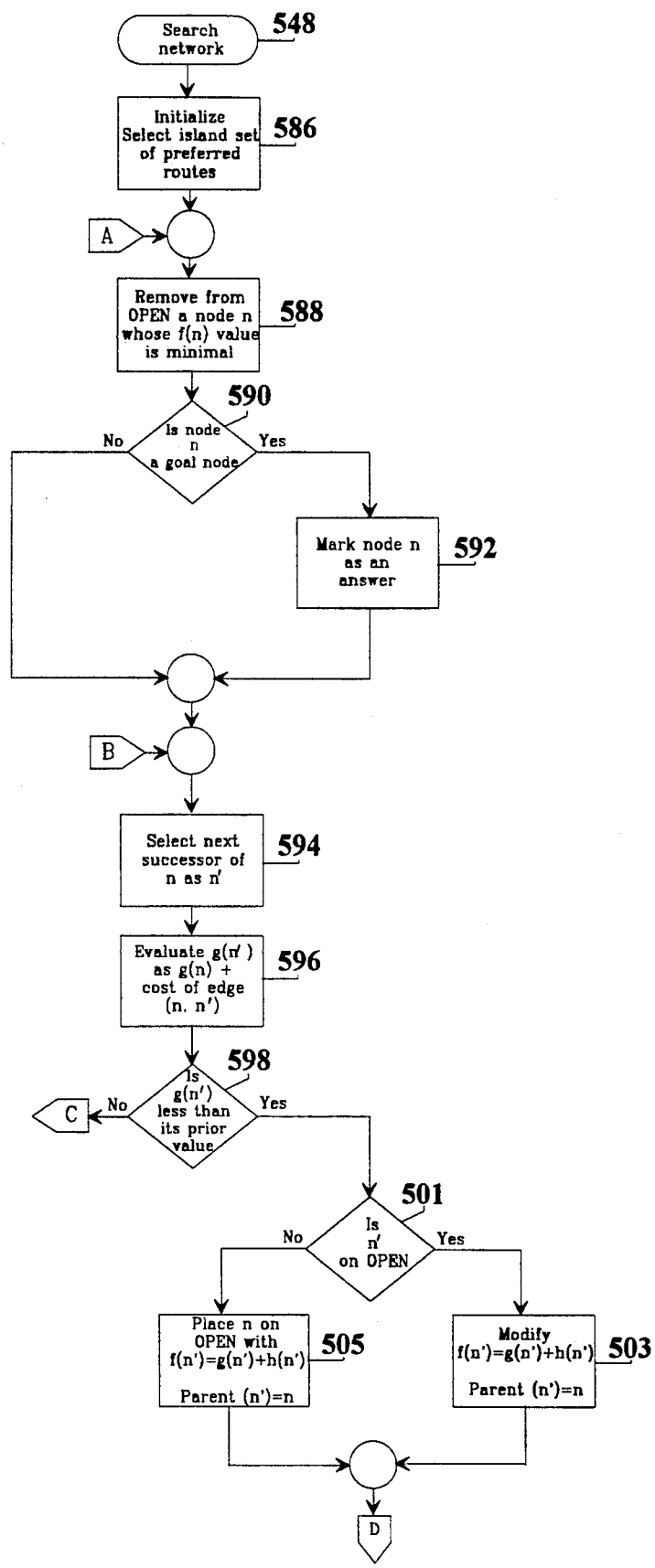
Figure 5H:
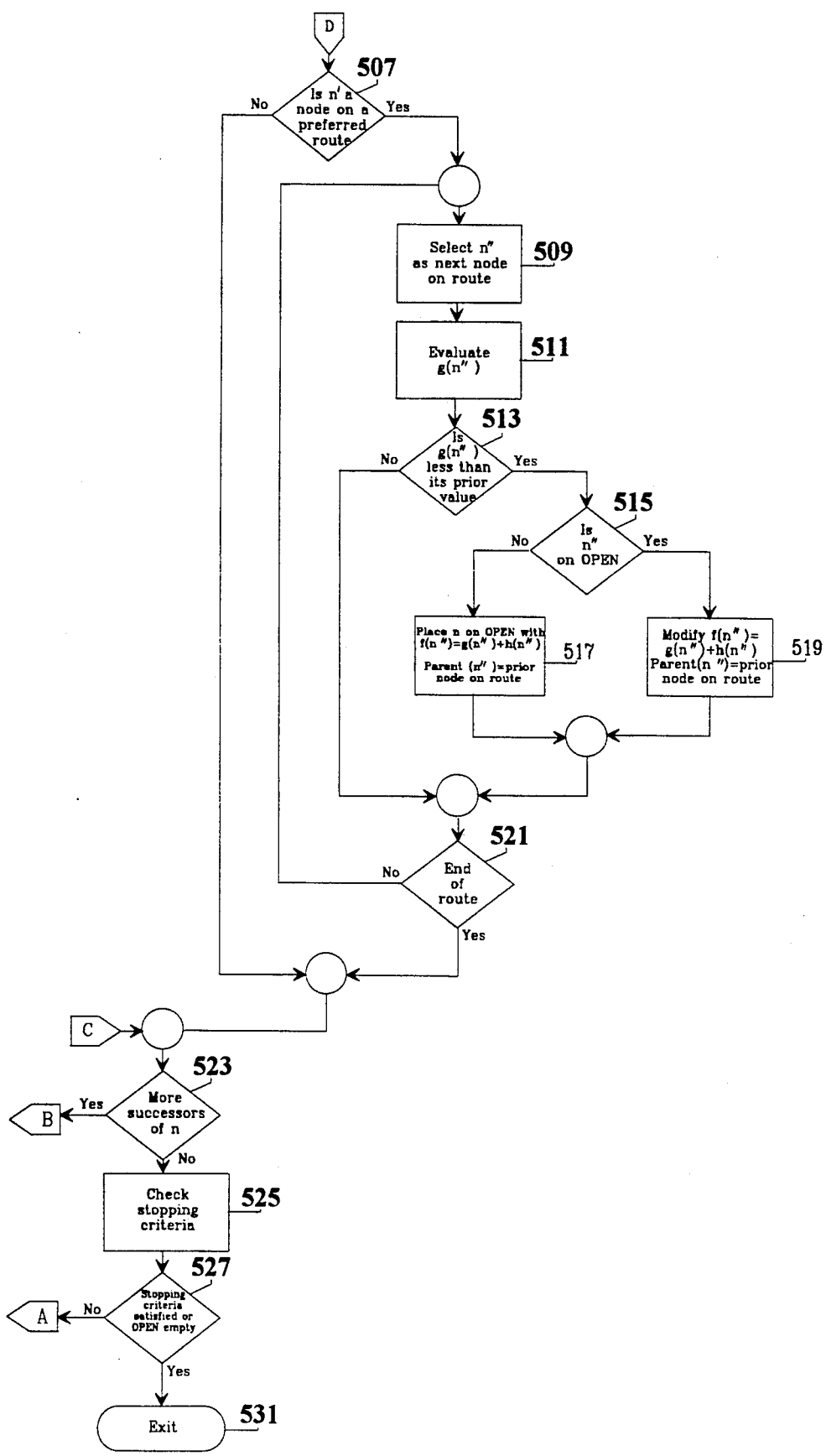

The preprocess sink or goal nodes subroutine 546 is shown in flow chart form in FIG. 5f. The preprocess sink nodes subroutine is called from the itinerary query handler routine 510, as shown in FIG. 5c. Once called, the preprocess sink nodes subroutine 546 first determines at step 570 whether the caller has specified a departure or an arrival time. If it is determined at step 570 that an arrival time has been specified, then the subroutine 546 finds the stop/route segment combinations within walking distance of the origin of the caller at step 574.

If it is determined at step 570 that the caller has specified a departure time, then the subroutine 546 finds the stop/route segment combinations within walking distance of the destination at step 572. After the execution of steps 572 and 574, the preprocess sink nodes subroutine 546 exits to the calling routine at step 584.

FIGS. 5g-5h show the flow chart for the search network subroutine 548 which is called by the itinerary query handler routine 510. Once called, the search network subroutine 548 first initializes and selects an island set of preferred routes at step 586. The island set I is a finite set of nodes which are likely to be located on an optimal or near-optimal path from the start node to a goal node. The island set I may be different for different problem instances; it might depend on the start node or the goal set.

The nodes which comprise the set I or island set are called islands or island nodes. The Island Set is a finite set of nodes which are determined a priori to be most promising; that is, likely to lie along a good or optimal path to a goal node. I is first defined to be the set of nodes on the optimal path $\pi^*$. Then, when $\pi^*$ is unknown, I is used as an approximation for $I^*$. Intuitively, I is an unordered representation of an estimate of the optimal path.

When the estimate of the optimal path is imperfect (i.e. $I \neq I^*$), there are two types of errors. Type I errors are errors of commission: nodes in the set $\{I \setminus I^*\}$, where $\setminus$ is the set subtraction operator. Type II errors are errors of omission: nodes in the set $\{I^* \setminus I\}$. The rate of type I errors in an island set is defined as $$\alpha \triangleq \frac{|I \setminus I^*|}{|I|}$$

where $|A|$ denotes the cardinality of set A. Similarly, the rate of type II errors in an island set is defined as $$\beta \triangleq \frac{|I^* \setminus I|}{|I^*|}$$

Defining the island set implicitly defines its indicator function: The perfect indicator function can be defined similarly:

$$\gamma(n) \triangleq \begin{cases} 1, & n \in I \\ 0, & n \notin I \end{cases}$$

$$\gamma^*(n) \triangleq \begin{cases} 1, & n \in I^* \\ 0, & n \notin I^* \end{cases}$$

When there is only one goal node, the Island Set should clearly contain that goal node. Other island nodes may be identified by beginning a backward search from the goal node toward the start node, or by a domain-specific criterion identified by the systems analyst. In general, the selection of the island set and stopping criteria will have great impact both on the convergence of the algorithm and on the length of the path returned.

The problem of finding the shortest path from node $n_1$ to $n_{10}$ at time s, in the network is disclosed below in conjunction with Table 1. In Table 1, the nodes are marked with their node numbers, the edge costs noted are $C_{ij}(t)$, and the table represents the values of the heuristic function $h(n)$. For this example, assume the edge costs are invariant when t lies in the interval $[s, s+14]$.

The implementor is responsible for providing a heuristic function, an island set, and stopping criteria. The stopping criteria are discussed below. The heuristic function $h(n)$ is presented in Table 1. Let the island set $I = \{n_7, n_{10}\}$. For this example, any stopping criteria would work: the algorithm converges to the optimal path in the first iteration; the subsequent iterations serve only to confirm optimality.

TABLE 1

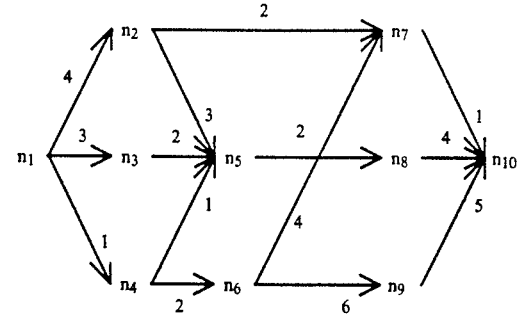

| node | Heuristic Function Values h(n) |
|---|---|
| $n_1$ | 4 |
| $n_2$ | 3 |
| $n_3$ | 3 |
| $n_4$ | 3 |
| $n_5$ | 2 |
| $n_6$ | 2 |
| $n_7$ | 1 |
| $n_8$ | 1 |
| $n_9$ | 1 |
| $n_{10}$ | 0 |

To begin processing, the start node $n_1$ is placed on OPEN, with $f=0$. It is immediately removed from OPEN and placed on CLOSED. Then each successor of $n_0$ is placed on OPEN, with a pointer directed at $n_1$. Of the 3 successors, only $n_2$ has a successor which is an island node. That island node, $n_7$ is placed on OPEN, with a pointer directed at $n_2$; the recursive invocation of step $5d$ causes node $n_{10}$ to be placed on OPEN, with a pointer back to $n_7$. At the end of step 5, the OPEN list appears as shown below in Table 2.

TABLE 2

| node | f(n) = g(n) + h(n) | Parent |
|---|---|---|
| $n_2$ | 7 = 4 + 3 | $n_1$ |
| $n_3$ | 6 = 3 + 3 | $n_1$ |
| $n_4$ | 4 = 1 + 3 | $n_1$ |
| $n_7$ | 7 = 6 + 1 | $n_2$ |
| $n_{10}$ | 7 = 7 + 0 | $n_7$ |

At step 6, the stopping criteria are checked to determine if the algorithm should be interrupted. The algorithm may be interrupted after the first iteration; the rule may specify interruption once a goal node is on OPEN. If so, it will return the path of length 7 found by tracing back the parent pointers from goal node $n_{10}$. This path is $\{n_1, n_2, n_7, n_{10}\}$. Otherwise, the algorithm continues to the next iteration.

Iteration 2. Node $n_4$ is removed from OPEN and placed on CLOSED. Then each successor of $n_4$ is placed on OPEN, with a parent pointer directed at $n_4$. Of the 2 successors, only $n_6$ has a successor which is an island node. That island node, $n_7$ is already on OPEN, with $f=7$. To redirect the parent pointers would increase f to 8, so no label correction is performed. At the end of step 5, the OPEN list appears as in Table 3 below.

TABLE 3

| node | f(n) = g(n) + h(n) | Parent |
|---|---|---|
| $n_2$ | 7 = 4 + 3 | $n_1$ |
| $n_3$ | 6 = 3 + 3 | $n_1$ |
| $n_7$ | 7 = 6 + 1 | $n_2$ |

TABLE 3-continued

| node | f(n) = g(n) + h(n) | Parent |
|------|---------------------|--------|
| $n_{10}$ | 7 = 7 + 0 | $n_7$ |
| $n_5$ | 4 = 2 + 2 | $n_4$ |
| $n_6$ | 5 = 3 + 2 | $n_4$ |

At step 6, the stopping criteria are checked. If the algorithm is halted, the algorithm will return the path of length 7 identified during the first iteration. Otherwise it could continue for up to seven additional iterations.

Table 4 shows the application of the Island Set to the problem of solving itinerary decisions for transit networks. The steps shown in Table 4 implement the algorighm IA*.

TABLE 4

0: For each node $n_i$ in the network, set $t_i = \infty$. Determine an island set I appropriate for the problem instance, depending on the origin, destination, and the transit mode for each node.

1: For the start node $n_0$, set label $t_0$ to the time that the transit rider could be at the transfer point corresponding to the node (in the direct or loading/unloading model), or to the transfer point corresponding to the head of the node (in the route segment model). Place node $n_0$ on OPEN.

2: If OPEN is empty, exit with failure.

3: Remove from OPEN and place on CLOSED a node $n_k$ for which $f(n_k) = t_k + h(n_k)$ is minimum among all nodes on OPEN. Make permanent $t_k$ and $PARENT_k$.

4: If $n_k$ is a goal node, exit successfully with the itinerary obtained by tracing back the pointers from $n_k$ to s.

5: For each node $n_j \in SCS (n_k)$ compute $l_k(t_k)$.

5a: If $n_j$ is not already on OPEN or CLOSED, calculate $f(n_j) = l_k(t_k) + h(n_j)$, and place $n_j$ on OPEN, with a pointer directed back to $n_k$.

5b: If $n_j$ is already on OPEN or CLOSED, direct its pointer to the node $n_i$ yielding the lowest $g(n_j) = l_{ij}$, and update $f(n_j)$.

5c: If $n_j$ required pointer adjustment and was found on CLOSED, remove it from CLOSED and place it on OPEN.

5d: For each node $n_l \in \{SCS(n_k) \cap I\}$,
  i. If $n_l$ is already on OPEN and $t_j(t_j) < g(n_l)$, update $g(n_l)$ and $f(n_l)$, and direct the parent pointer from node $n_l$ to node $n_j$.
  ii. If $n_l$ is not already on OPEN or CLOSED, estimate $h(n_l)$ and calculate $f(n_l) = t_j(t_j) + h(n_l)$. Place $n_l$ on OPEN with its pointer directed to $n_k$. Invoke step 5d recursively, with $n_l$ in place of $n_k$.

6: Check the stopping rules to determine whether to interrupt the algorithm or to continue for another iteration. If the stopping criteria are not satisfied, go to step 2. If the stopping criteria are satisfied, interrupt the algorithm. Exit successfully with the itinerary obtained by tracing back the pointers from the goal node that minimizes f(m) over all goal nodes m on OPEN.

The search network subroutine 548 then removes from the OPEN list a node n whose f(n) value is minimal, at step 588. At step 590, a determination is made of whether each particular node is a goal node. If an affirmative determination is made at step 590, then the node n is marked as an answer at step 592. After the execution of step 592 or if the determination at step 590 is negative, the search network subroutine 548 then selects the next successor of the node n as n' at step 594.

The function g(n') is evaluated as g(n) plus the cost of the edge (n, n') at step 596. A determination is then made at step 598 of whether the function g(n') is less than its prior value. If an affirmative determination is made at step 598, then a determination is then made at step 501 of whether n' is open.

If a negative determination is made at step 598, then a determination is made at step 523 on FIG. 5h of whether there are more successors of n to be evaluated. If a negative determination is made at step 523, meaning that there are no more successors of the node n to be evaluated, then the stopping criteria are checked at step 525 and then a determination is made at step 527 of whether the stopping criteria have been satisfied or the OPEN set is empty. If an affirmative determination is made at step 527, then it has been determined that the goal node has been located and the search network subroutine then exits at step 531.

If the determination at step 527 is negative, then the search network routine jumps back to begin processing again at step 588.

If it is determined at step 523 that there are more successor nodes of node n to be evaluated, then the search network subroutine jumps to begin processing again at step 594 by selecting the next successor of node n as n'. At step 525, the stopping criteria are checked. These include rules based on the total number of nodes placed on OPEN, the number of nodes placed on OPEN since the last improved path was found, and the total clock time elapsed since the operator entered the caller's inquiry. For each of these three values, the system supervisor maintains a critical level. If any of these values exceeds its critical level, or if the OPEN list is emptied, an affirmative determination is made at step 527. This means that, in the interest of response time, the best path currently known should be returned by the search network module 548, rather than continuing to search for possibly improved paths.

Once an affirmative determination is made at step 598, a determination is made at step 501 of whether n' is on OPEN. That indicates that a path from the same node to node n' is already known, but that path is longer than the path just identified. If an affirmative determination is made at step 501, then the function f(n')=g(n')+h(n') is modified, and the function parent (n') is set equal to n at step 503. That serves the purpose of redirecting the parent pointers along the new, shorter path. In that fashion, the parent pointers are updated so that they always indicate a path from the source node to each goal node on OPEN, and the path indicated is the best path known at the current iteration.

If a negative determination is made at step 501, meaning that n' is not on OPEN and thus no path from the source node to path n' is already known, n' is placed on OPEN with the function f(n')=g(n')+h(n') and the function parent (n') is set equal to n, all at step 505. After the steps 505 and 503 are performed, a determination is next made at step 507 of whether n' is a node on a preferred route. If it is determined at step 507 that the node n' is a node on a preferred route, then a node n" is selected as the next node on the route at step 509 and the function g(n") is evaluated at step 511. If a negative determination is made at step 507, meaning that node n' is not an island node, then the processing continues at step 523.

A determination is made at step 507 of whether n' is on a preferred route. If a negative determination is made at step 507, meaning that n' is not an island node, the search network subroutine 548 then proceeds with the test at step 523.

If an affirmative determination is made at step 507, meaning that n' is a member of the island set, then the loop represented by steps 509 through 521 is executed for each node on that route. The purpose of this loop is to assure that a feasible path to one of the goal nodes is found as early as possible, whenever that path lies within the island set. In particular, since the nodes on the route are inspected sequentially, the search network subroutine will tend to find a path to a goal node as soon as any node on the appropriate route is placed on OPEN, so long as that route is a preferred route. It has been demonstrated that whenever the optimal path from the source node to a goal node lies completely within the island set I, steps 509 through 521 cause that optimal path to be found before the second time that the loop starting at step 588 is executed. When that is not the case, meaning that there are type II errors in the Island Set, and beta is greater than 0.0, more iterations are necessary before the search network subroutine converges upon the optimal path.

After step 511, a determination is made at step 513 of whether the function g(n") is less than its prior value. If a negative determination is made at step 513, then a determination is made at step 521 of whether the end of the route has been reached. If the end of the route has been reached at step 521, then the search network subroutine continues processing at step 523.

If a negative determination is made at step 521, meaning that the end of the route has not been reached, then the network search subroutine returns and begins processing again at step 509.

If an affirmative determination is made at step 513, meaning that the newly identified path to node n" is better than any path already known, a determination is made at step 515 of whether the node n" is OPEN. If an affirmative determination is made at step 515, then the function f(n")=g(n")+h(n") is modified and the function parent (n") is set equal to the prior node on the route.

If a negative determination is made at step 515, meaning that node n" is not on OPEN and no path to it is known, then the node n" is placed on OPEN with the function f(n")=g(n")+h(n") and the parent pointer of n" is directed to the prior node on the route. After the execution of steps 517 and 519, a determination is made at step 521 of whether the current node is the end of the route.

Figure 5I:
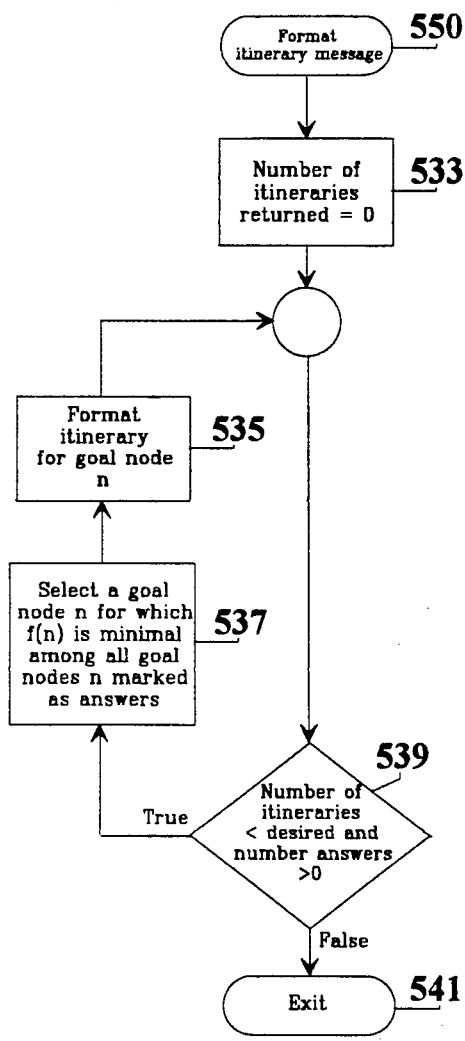

The format itinerary message subroutine 550, which is called from the itinerary query handler routine 510, is shown in flow chart form on FIG. 5i. After being called, the format itinerary message subroutine 550 first sets the number of itineraries returned to equal 0 at step 533. A determination is then made at step 539 of whether the number of itineraries is less than the number desired and whether the number of answers is greater than 0. If the determination at step 539 is negative, then the format itinerary message subroutine exits at step 541.

If the determination at step 539 is affirmative, meaning that more iterations are desired, then a goal node n is selected for which the function f(n) is a minimal along all goal nodes marked as answers at step 537 and then an itinerary is formatted for the goal node n at step 535. Step 539 is then executed again.

It should be understood that, although the examples given herein of the decision support system have been implemented in order to achieve decision making performance with respect to the specific utilization of a rapid transit system as disclosed herein, the instant inventive decision support system can be used in many other environments, such as airline and highway routing and personnel and industrial process scheduling.

Although only a preferred embodiment is specifically illustrated and described herein, it will be appreciated that many modifications and variations of the present invention are possible in the light of the above teachings and within the purview of the appended claims without departing from the spirit and intended scope of the invention.

I claim:

1. A method for computing shortest paths through a network that includes a plurality of nodes in which each node is connected to at least one successor node in said plurality of nodes, comprising the steps of:
   (a) selecting a starting node from said plurality of nodes on said network and selecting a goal set of nodes from said plurality of nodes on said network;
   (b) identifying each of the successor nodes to the selected node from said plurality of nodes on said network;
   (c) computing a value for an evaluation function corresponding to each of said successor nodes;
   (d) placing each of said successor nodes on a list;
   (e) removing from the list a node which has an extreme value for the evaluation function computed in step (c) when compared with all other nodes which are on the list;
   (f) identifying each of the successor nodes for each of said successor nodes identified in step (b), and calculating a value corresponding to each of said successor nodes in accordance with an evaluation function;
   (g) placing each of said successor nodes identified in step (f) on said list;
   (h) comparing each of the nodes identified in step (f) to a set of predetermined island nodes and, for each node that is determined to be an island node,
      ($h_1$) determining the successor nodes for each island node that are also island nodes
      ($h_2$) computing a value for an evaluation function corresponding to each of said nodes identified in step ($h_1$); and
      ($h_3$) placing each of said nodes for which a value is computed in step ($h_2$) in said list;
   (i) continuing identification of successor nodes of nodes removed from said list and computing a value for each of said identified successor nodes until certain predetermined stopping criteria are achieved; and
   (j) counting the total number of nodes removed from the list in step (e), the number of nodes removed from the list in step (e) since the last improved path was found, and the number of signals issued by a timer; and terminating step (i) when one of said numbers exceeds a given critical level.

2. The method of claim 1 wherein said plurality of nodes comprises a transit network.

* * * * *